Feb. 17, 1931.   B. S. HARRIS ET AL   1,792,691
SWATHER
Filed Dec. 5, 1928

Inventors
B. S. Harris
H. M. Johnston
by J. Edw. Maybee
ATTY.

Patented Feb. 17, 1931

1,792,691

UNITED STATES PATENT OFFICE.

BURTON S. HARRIS AND HOWARD M. JOHNSTON, OF TORONTO, ONTARIO, CANADA, ASSIGNORS TO MASSEY-HARRIS COMPANY, LIMITED, OF TORONTO, CANADA

SWATHER

Application filed December 5, 1928. Serial No. 323,963.

This invention relates to agricultural implements adapted to cut, convey and discharge the cut grain to form a windrow, and the object of our invention is to so provide a machine of this character that the cut grain may be delivered from the machine at any one of a plurality of positions transversely of the machine.

We attain our object by so constructing our swather that it may readily be converted from an end to a center delivery or vice versa.

Figure 1:
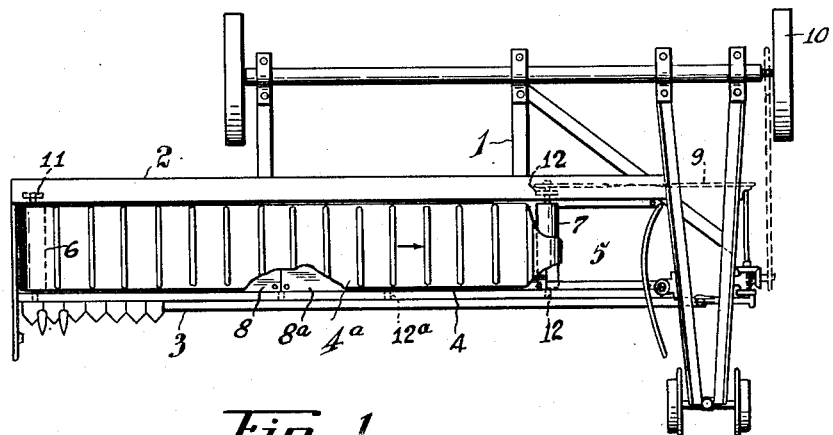
Figure 2:
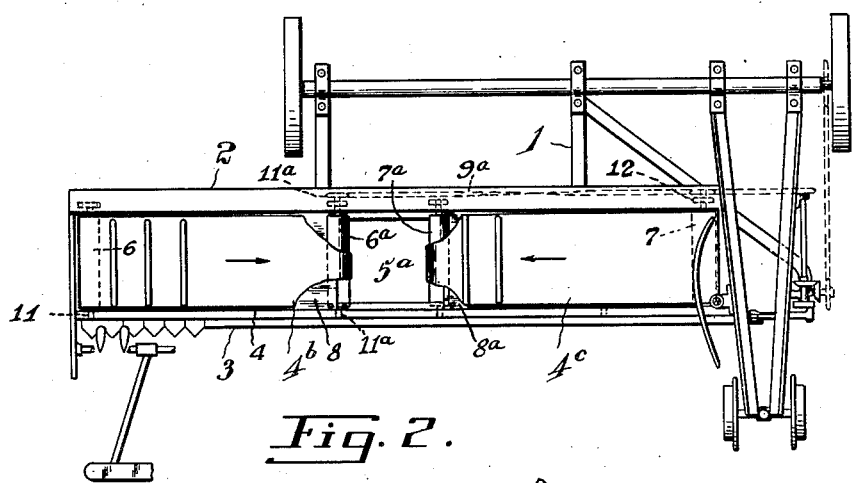
Figure 3:
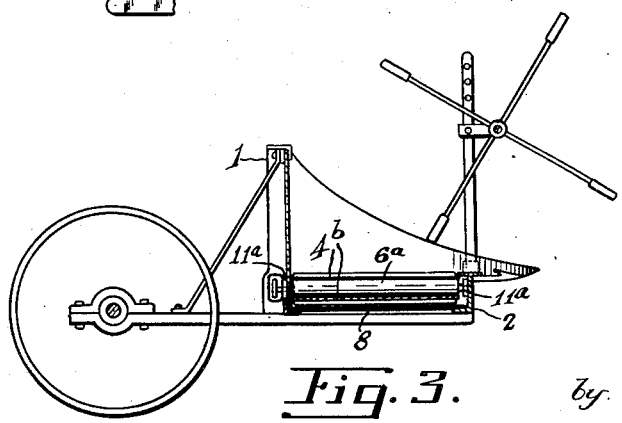

The constructions are hereinafter described and are fully illustrated in the accompanying drawings in which Fig. 1 is a plan view of our swather showing it arranged for end delivery;

Fig. 2 a view similar to Fig. 1 showing the arrangement for center delivery; and Fig. 3 an end elevation thereof.

In the drawings like numerals of reference indicate corresponding parts in the different figures.

1 is the frame of the machine which includes the usual platform 2, cutter bar 3 and conveying apparatus 4. The latter comprises one or more endless conveyors $4^a$ or $4^b$ and $4^c$, the combined length of the last two being substantially the same as the length of the conveyor $4^a$. The conveyor $4^a$ (see Fig. 1) passes around the rollers 6, 7 which are journalled in bearings 11, 12 formed in or carried by the platform so that the rollers may be positioned at different points longitudinally thereof.

On the platform beneath the conveying apparatus 4 is carried a two piece tray 8, $8^a$ the combined length of which is substantially equally to the length of the conveyor $4^a$ which is shorter than the platform 2 so that a delivery opening 5 is formed at the end of the conveyor. This delivery opening 5 may be formed at the other end of the machine by shifting the rollers 6 and 7 into a fresh set of bearings, or by shifting the bearings longitudinally of the platform and by shifting the tray pieces 8 and $8^a$. In this case the roller 7 would occupy the position in which it is shown in Fig. 2, and the chain 9 forming part of the drive connection between the wheel 10 and the conveyor $4^a$ would be shortened.

When it is desired to convey the grain cut by the cutter bar 3 to a center delivery opening $5^a$, the tray pieces 8, $8^a$ are spread apart and secured to the opposite ends of the platform 2 (see Fig. 2). The conveyors $4^b$, $4^c$ are now used instead of the single conveyor $4^a$, and these conveyors are carried on the rollers 6, $6^a$ and 7, $7^a$ respectively. Bearings $11^a$ and $12^a$ are provided for receiving the journals of the rollers $6^a$, $7^a$ so that this change may be readily made in the field. In this case the chain $9^a$ will mesh with sprockets carried by the rollers 7, and $6^a$ so that the conveyors $4^b$, $4^c$ will travel in opposite directions towards the opening $5^a$.

As the rollers $6^a$ and $7^a$ may be left in position while the conveyor $4^a$ is being used, and the latter may be joined in two places so that one part of it will form the conveyor $4^b$, it will be necessary to carry only a short piece of conveyor for attachment to the other part of the conveyor $4^a$ to form the conveyor $4^c$. This short piece of conveyor material and a piece of chain long enough for attachment to the chain 9 to permit it to reach from the sprocket of the roller 7 in Fig. 2 to the sprocket of the roller $6^a$ are thus all the extra equipment required to obtain a delivery of the grain at any one of three positions.

Any suitable gearing may be employed to drive the conveyors $4^a$, or $4^b$ and $4^c$ to convey the cut grain towards the openings 5 or $5^a$. If the chains 9, $9^a$ be employed as part of the gearing, the chain 9 in Fig. 1 will be crossed to drive the conveyor $4^a$ toward the right as indicated by arrow in this figure. Should the opening 5 be formed at the left hand end of the machine the chain 9 will be open to drive the conveyor toward the left. In Fig. 2 the right hand end of the chain $9^a$ will be open to drive the right hand conveyor $4^c$ towards the left and the portion of the chain between the sprockets of the rollers $6^a$ and 7 will be crossed to drive the left hand conveyor towards the right.

What we claim as our invention is:

1. A swather including an open platform; conveying apparatus having a total length less than that of the platform to form a delivery opening through which grain may be discharged; rollers for supporting the conveying apparatus; and means for journalling the rollers at different points longitudinally of the platform to position the opening at either end or the center of the platform.

2. A swather including an open platform; a tray formed of a plurality of parts having a total length less than that of the platform to form a delivery opening through which grain may be discharged, the parts of the tray being shiftable longitudinally of the platform to position the opening at either end or the center thereof; and conveying apparatus adapted to be altered to convey the grain to any position of the delivery opening.

3. A swather including an open platform; a tray formed of a plurality of parts having a total length less than that of the platform to form a delivery opening through which grain may be discharged, the parts of the tray being shiftable longitudinally of the platform to position the opening at either end or the center thereof; a plurality of rollers adapted to be positioned at various points longitudinally of the platform to suit the position of the delivery opening; and conveying means carried by the rollers to convey the grain to the delivery opening.

Signed at Toronto this 21st day of November, 1928.

BURTON S. HARRIS.
HOWARD M. JOHNSTON.